United States Patent Office 3,112,343
Patented Nov. 26, 1963

3,112,343
FREE-FLOWING, STORAGE STABLE GRANULAR
OR PELLETIZED UREA
Kurt Allgeuer and Ferdinand Weinrotter, Linz, Austria,
assignors to Osterreichische Stickstoffwerke Aktiengesellschaft, Linz, Austria
No Drawing. Filed Aug. 9, 1960, Ser. No. 48,341
Claims priority, application Austria Aug. 20, 1959
5 Claims. (Cl. 260—555)

Maintenance of the free-flowing capacity of crystalline, granular, particulate or pelletized urea, i.e. prevention of agglomeration of the urea particles, granules or pellets, even under long storage conditions, has long been a problem in the art. This problem has heretofore been dealt with, almost exclusively, by providing the urea particles with surface coatings of material such as kieselguhr and the like, designed to prevent the undesired adhesion of particle to particle. The surface treatment or powdered coating mode of dealing with the problem has not been entirely satisfactory since the result has been to effect a reduction in the nitrogen content of the final product—manifestly undesirable in many situations, as where for example the urea is to be used in applications (as in fertilizers) which depend largely or primarily on the easily available high nitrogen content of the product—the extra operational step in the manufacture of the commercial product by this prior art method with consequent increase in cost is not justified in view of the reduction in nitrogen content. Furthermore, a product with a coating such as kieselguhr or the like is uneconomical due to the considerable losses encountered by "dusting off" of the pulverulent coating material.

Furthermore it was tried to prevent resorption of water by urea by spraying on of a solution of a urea-formaldehyde condensation product on to the pellets or crystals of urea or by treatment of the solid urea by formaldehyde vapors. All superficial treatments of urea pellets and the like proved to be less satisfactory or completely insufficient.

These defects of the prior art are obviated according to the present invention by the expedient, briefly stated, of incorporating in the urea, during the process of manufacture thereof or during the form-imparting (granulating, pelletizing) operation, water-soluble urea-formaldehyde condensation product in such small quantity that the desired properties—storage-stability, retention of free flowing capacity, non-agglomeration—are assured, while the product remains useful for all practical purposes to which the urea itself may be put and the cost of the admixture is not noteworthily increased.

In carrying out the invention as thus outlined, use is made of water-soluble urea-formaldehyde condensation product in an amount of at most 5% of the weight of the weight of the urea, and preferably only from about 0.1 to about 0.2% of the weight of the urea.

The urea-formaldehyde condensation product suitable for admixture with the urea, in accordance with the present invention, is advantageously prepared by condensation of 35 mols of formaldehyde with 15 to 25, and preferably with 18 to 22, mols of urea. To prepare such condensation product—taking by way of example one made from 35 mols of formaldehyde and 20 mols of urea—the formaldehyde (35 mols) in the form of a 30% aqueous formalin solution is brought to pH 8 with aqueous caustic soda solution, admixed with 20 mols of urea, and heated to 85° C. The pH value of the hot solution is adjusted to 4.5 with acid and after 5 minutes is again raised to a pH value of 8 with caustic soda. The reaction solution, having a density of 1.16, is concentrated to a density of 1.19 by evaporation under reduced pressure.

Even changing the mol ratio between formaldehyde and urea within the above mentioned limits, a water soluble condensation product is obtained which is applicable according to the invention. In this case 3512 grams of 30% formaldehyde (corresponding to 35 mols formaldehyde) are adjusted with the necessary quantity of 1 N-NaOH to a pH-value of 8, and subsequently 900 grams urea (corresponding to 15 mols urea) are added. After dissolution of urea its solution is heated to 85° C. and then acidulated up to a pH-value of 4.5 with 1 N-$H_2SO_4$ whereby condensation is started. After 5 minutes the pH-value is brought to 8 again by adding 1 N-NaOH thereby stopping condensation again. The hereby obtained condensation product having a density of $D^{20}=1.15$ is concentrated by evaporation under reduced pressure to a density $D^{20}=1.22$. The yield of water soluble urea-formaldehyde condensation product is 3 kgs.

In preparing the final product according to the invention, an anhydrous urea melt, or a urea melt containing only a small percentage of water, is intimately admixed with concentrated aqueous solution of the water-soluble urea-formaldehyde condensation product and the mixture then given the desired form in per se conventional manner, for example by pelletizing, spraying or granulation. Alternatively a water soluble condensation product, for example in solid form or preferably as the concentrated aqueous solution is added to an aqueous urea solution, as obtained for example in the synthesis of urea from ammonia and carbon dioxide, and the mixture then worked up into the desired final form. In both cases, there results a molecular, i.e. optimal, distribution of the condensation product in the urea, thereby assuring the initially described properties of the obtained urea mixture.

Since there is no protective coat on the single urea pellets but an intimate mixture of the urea with the admixture which is preventing the migration of water within the urea pellet, the unavoidable damage to the surface of the pellet cannot suspend the effect of the admixture.

The following examples set forth, solely by way of illustration, presently preferred embodiments of the invention.

Example 1

20 kilograms of a highly concentrated aqueous solution (density 1.19) of urea-formaldehyde condensation product are stirred continuously in the course of 5 hours into 10 tons (metric) of molten urea, having a water content of 1.5% by weight, at a temperature of 131° C., this temperature being maintained throughout the admixing operation. The so-obtained melt is then pelletized or converted into particulate or granular form in any suitable per se conventional manner, dried and cooled.

The thus-obtained product contains 0.4% by weight of water. In storage, the product remains free-flowing even under high load and during an extended storage period. A granular product from the same urea melt but without the urea-formaldehyde condensation product addition is entirely agglomerated upon similar storage.

The concentrated aqueous solution of urea-formaldehyde condensation product is prepared by adding aqueous soduim hydroxide solution to formaldehyde (35 mols) in the form of a 30% aqueous formalin solution until the pH of the mixture is 8, after which 20 mols of urea are added, and the mixture heated to 85° C. The pH value of the hot solution is adjusted to 4.5 with hydrochloric acid and after 5 minutes is again raised to a pH value of 8 with sodium hydroxide. The so-obtained aqueous solution of urea-formaldehyde condensation product is concentrated to a density of 1.19 by evaporation under reduced pressure.

Example 2

2 kilograms of urea-formaldehyde condensation product in the form of an aqueous solution thereof are uniformly admixed with 4 metric tons of an aqueous urea solution of 48% by weight concentration. The resultant solution admixture is evaporated down to a concentration of 98% by weight of solute, and is then worked up into particulate or pellet form by any suitable conventional process. The obtained urea particles, granules or pellets, containing urea-formaldehyde condensation product in admixture, are after-dried to a water content of 0.5% by weight.

The so-obtained product remains free-flowing even upon long storage under high load, while granules of urea lacking the urea-formaldehyde condensation product addition are solidly agglomerated on storage under like conditions.

In case of this example the urea-formaldehyde condensation product is prepared in the same manner as described in Example 1.

As is evident from the foregoing, the essence of the present invention is in the incorporation of the water-soluble urea-formaldehyde condensation product into the urea being processed. The particular water-soluble urea-formaldehyde condensation product is not of the essence and does not constitute the invention per se, nor does the method of production of such condensation product. Thus, the latter may assume a wide variety of forms.

The free-flowing, storage-stable urea granules, pellets or the like containing in admixture at most 5% by weight, relative to the weight of the urea, of water-soluble urea-formaldehyde condensation product according to the present invention may as aforesaid be used for most uses to which the urea may itself be put, but are especially useful as fertilizer compositions with an easily available high nitrogen content and as constituents of such fertilizer compositions, i.e. compositions which contain other ingredients than the urea/urea-formaldehyde mixtures of the invention.

The subject of the invention has no connection with urea-formaldehyde condensation products in a 1:1 to 2:1 ratio of the components, being well known as long acting nitrogen fertilizers or as soil improving agents.

Having thus disclosed the invention, what is claimed is:

1. Free-flowing storage-stable granules, each granule being of homogeneous composition throughout and consisting essentially of urea and water-soluble urea-formaldehyde condensation product, the quantity of the latter in each granule being within the range from about 0.1 to at most 5% by weight, and said condensation product being the water-soluble condensation product of 35 mols of formaldehyde with 15 to 25 mols of urea and being obtained by heating a mixture of the formaldehyde in the form of an aqueous solution thereof at about pH 4.5 with the urea and then concentrating the resultant aqueous solution of urea-formaldehyde condensation product.

2. Free-flowing storage-stable granules, each granule being of homogeneous composition throughout and consisting essentially of urea and water-soluble urea-formaldehyde condensation product, the quantity of the latter in each granule being within the range from about 0.1 to 0.2% by weight, and said condensation product being the water-soluble condensation product of 35 mols of formaldehyde with 18 to 23 mols of urea and being obtained by heating a mixture of the formaldehyde in the form of an aqueous solution thereof at predominantly about pH 4.5 with the urea and then concentrating the resultant aqueous solution of urea-formaldehyde condensation product.

3. The method of imparting to granules consisting predominantly of urea the property of non-agglomeration, whereby the said granules remain free-flowing during protracted storage, which comprises stirring water-soluble urea-formaldehyde condensation product into substantially anhydrous urea in the molten state until a melt of homogeneous composition throughout is achieved and then converting the said melt into granular form, whereby each granule is of homogeneous composition throughout and consists essentially of urea and water-soluble urea-formaldehyde condensation product, the proportions being such that each granule contains from about 0.1 to at most 5% by weight of said condensation product, the latter being the water-soluble condensation product of 35 mols of formaldehyde with 15 to 25 mols of urea and being obtained by heating a mixture of the formaldehyde in the form of an aqueous solution thereof at predominantly about pH 4.5 with the urea and then concentrating the resultant aqueous solution of urea-formaldehyde condensation product.

4. The method of imparting to granules consisting predominantly of urea the property of non-agglomeration, whereby the said granules remain free-flowing during protracted storage, which comprises stirring an aqueous solution of water-soluble urea-formaldehyde condensation product into substantially anhydrous urea in the molten state until a substantially anhydrous melt of homogeneous composition throughout is obtained and then converting the said melt into granular form, whereby each granule is of homogeneous composition throughout and consists essentially of urea and water-soluble urea-formaldehyde condensation product, the proportions being such that each granule contains from about 0.1 to about 0.2% by weight of said condensation product, the latter being the water-soluble condensation product of 35 mols of formaldehyde with 15 to 25 mols of urea and being obtained by heating a mixture of the formaldehyde in the form of an aqueous solution thereof at predominantly about pH 4.5 with the urea and then concentrating the resultant aqueous solution of urea-formaldehyde condensation product.

5. The method of imparting to granules consisting predominantly of urea the property of non-agglomeration, whereby the said granules remain free-flowing during protracted storage, which comprises stirring an aqueous solution of water-soluble urea-formaldehyde condensation product into an aqueous solution of urea until a homogeneous solution is obtained, then evaporating off the water, and converting the residue into granular form, whereby each granule is of homogeneous composition throughout and consists essentially of urea and water-soluble urea-formaldehyde condensation product, the proportions being such that each granule contains from about 0.1 to about 0.2% by weight of said condensation product, the latter being the water-soluble condensation product of 35 mols of formaldehyde with 15 to 25 mols of urea and being obtained by heating a mixture of the formaldehyde in the form of an aqueous solution thereof at predominantly about pH 4.5 with the urea and then concentrating the resultant aqueous solution of urea-formaldehyde condensation product.

References Cited in the file of this patent

UNITED STATES PATENTS

| 1,865,398 | Goldsmidt et al. | June 28, 1932 |
| 2,428,752 | Hewett | Oct. 7, 1947 |
| 2,502,996 | Rohner | Apr. 4, 1950 |
| 2,712,557 | Michelitsch et al. | July 5, 1955 |

OTHER REFERENCES

Clark et al.: Ind. and Eng. Chem., volume 40 (1948), pages 1178–83, at pages 1178 and 1182.